United States Patent
Isaac et al.

(10) Patent No.: US 11,946,808 B2
(45) Date of Patent: Apr. 2, 2024

(54) SINGLE-FIBER COLOR IDENTIFICATION

(71) Applicant: SUBCOM, LLC, Eatontown, NJ (US)

(72) Inventors: Rejoy Isaac, Westwood, NJ (US);
Marsha Ann Spalding, Hampton, NJ (US); Bryce Currier, Dover, NH (US); Geraldine Paraiso, Eatontown, NJ (US); Ralph J. Rue, Barnegat, NJ (US)

(73) Assignee: SubCom, LLC, Eatontown, NJ (US)

( * ) Notice: Subject to any disclaimer, the term of this patent is extended or adjusted under 35 U.S.C. 154(b) by 138 days.

(21) Appl. No.: 17/697,217

(22) Filed: Mar. 17, 2022

(65) Prior Publication Data
US 2022/0404200 A1    Dec. 22, 2022

Related U.S. Application Data

(60) Provisional application No. 63/230,249, filed on Aug. 6, 2021, provisional application No. 63/212,415, filed on Jun. 18, 2021.

(51) Int. Cl.
*G01J 3/28* (2006.01)
*G01J 3/46* (2006.01)
*G01M 11/00* (2006.01)

(52) U.S. Cl.
CPC ............ *G01J 3/2823* (2013.01); *G01J 3/463* (2013.01); *G01M 11/30* (2013.01)

(58) Field of Classification Search
CPC ............ G01M 11/30; G01J 2003/2826; G01J 3/2823; G01N 21/251
See application file for complete search history.

(56) References Cited

U.S. PATENT DOCUMENTS

| | | | |
|---|---|---|---|
| 4,731,663 A | 3/1988 | Kovalchick | |
| 6,002,477 A | 12/1999 | Hammer | |
| 6,798,517 B2 | 9/2004 | Wagner et al. | |

(Continued)

FOREIGN PATENT DOCUMENTS

| JP | 2015215239 A | 12/2015 | |
|---|---|---|---|
| JP | 6291994 B2 | 3/2018 | |
| WO | WO-2012021898 A2 * | 2/2012 | ............ G01C 15/02 |

OTHER PUBLICATIONS

Konica Minolta, "CM-700d Spectrophotometer at NPE—Konica Minolta Sensing" https://www.youtube.com/watch?v=khCkVudbz5l Sep. 16, 2009 (Year: 2009).*

(Continued)

*Primary Examiner* — Maurice C Smith
(74) *Attorney, Agent, or Firm* — KDW Firm PLLC (57) ABSTRACT

Disclosed are a system and techniques to determine a color of an optical fiber in a fiber optic cable. A spectrophotometer camera may obtain a color value of the optical fiber. A fiber adaptor is operable to hold a single optical fiber of a fiber optic cable in a field of view of the spectrophotometer camera. A memory storing instructions that, when executed by a processor, enable identifying a color of the optical fiber. The color value may be compared to a color value of a number of reference colors. A color match score value may be generated for the color value with respect to each reference color. A confidence value may be obtained for a pair of color match scores that are closest in score value. Based on the confidence value, one of the reference colors is identified as a color of the optical fiber.

17 Claims, 11 Drawing Sheets

(56) References Cited

U.S. PATENT DOCUMENTS

2002/0126286 A1 9/2002 Melnyk
2015/0228086 A1 8/2015 Maurer

OTHER PUBLICATIONS

Adrian YAP "Human-Eye versus Computerized Color Matching" Operative Dentistry, 1999 (Year: 1999).*
Anonymous: "Spectrophotometer CM-700d/600d", Konica Minolta—Jan. 1, 2007, pp. 1-3. URL: https://sensing.konicaminolta.us/wp-content/uploads/cm-700d_600d_catalog-5v0252564m.pdf.
European Search Report and Written Opinion for the European Application No. EP22177690, dated Nov. 28, 2022, 7 pages.

\* cited by examiner

| # | COLOR | L*(D65) | a*(D65) | b*(D65) |
|---|---|---|---|---|
| 1 | RED | 24.722 | 11.480 | 3.862 |
| 2 | BLUE | 23.355 | -1.716 | -6.919 |
| 3 | YELLOW | 31.000 | -0.907 | 12.142 |
| 4 | BROWN | 24.647 | 2.979 | 2.241 |
| 5 | GREEN | 27.388 | -6.709 | 4.983 |
| 6 | ORANGE | 26.123 | 6.918 | 7.225 |
| 7 | VIOLET | 25.326 | 5.451 | -10.537 |
| 8 | BLACK | 21.943 | 0.166 | 0.665 |
| 9 | ROSE | 32.748 | 4.900 | 0.243 |
| 10 | AQUA | 33.577 | -7.859 | -3.490 |
| 11 | OLIVE | 29.700 | -2.526 | 8.318 |
| 12 | WHITE | 36.899 | -0.433 | -0.262 |
| 13 | LIME | 30.768 | -4.516 | 6.552 |
| 14 | TAN | 33.049 | 1.982 | 1.790 |
| 15 | MAGENTA | 28.752 | 6.811 | -1.065 |
| 16 | GREY | 30.573 | -0.386 | -0.265 |
| 17 | NATURAL | 26.853 | 0.023 | 0.848 |
| 18 | DARK GREEN | 25.617 | -5.319 | 2.285 |
| 19 | LAVENDER | 34.709 | 0.336 | -1.249 |
| 20 | PURPLE | 22.972 | 1.005 | 0.090 |
| 21 | SKY | 37.450 | -3.368 | -1.881 |
| 22 | PINK | 32.670 | 1.068 | 0.356 |
| 23 | PEACH | 34.865 | 0.852 | 3.616 |
| 24 | SAFFRON | 29.824 | 1.593 | 7.355 |

SINGLE-FIBER COLOR IDENTIFICATION

BACKGROUND

Global communications (both voice and data) are predominantly carried across undersea fiber optic cables. A rising demand for higher network capacity is pushing system providers to design, among other technologies, undersea cables with increasing number of optical fibers. One of the factors that limits the number of fibers within a cable is the ability to identify specific fibers from the number of other fibers. The fibers in a cable must be uniquely identifiable to operate within the cable system. Unique identification is achieved by coloring each fiber with a unique color. Recently, transoceanic cable systems with fiber counts more than 18 paths have become common place. Cable operators are trained to visually identify each fiber by color. However, this human visual identification process can sometimes lead to errors (which can be very expensive to correct), especially as the number of unique colors increase beyond 12.

One of the techniques used to aid in distinguishing colors is to apply an identifier such as rings on repeat colors. This, however, can lead to an increased micro-bend loss on such fibers. Small incremental fiber attenuation can add significant cabling loss across the length of a system. This often results in increased costs and a degradation of the overall system efficiency due to the addition of repeaters.

Thus, a solution that can uniquely identify colors on a single strand of optical fiber, especially in high-fiber-count cables in a reliable, non-destructive, user-friendly manner would address one of the primary concerns of expanding the fiber count in submarine cables without the potential penalties of performance degradation from ring-marking or similar solutions. Implementing a solution that can quantify the fiber identification process also has the benefit of enhancing quality, which eventually results in cost benefits, by addressing the human-error factor.

Color spectrophotometers are widely used in various applications to measure color. These devices measure the intensity of the light reflected from the surface of the sample at each wavelength in the visible spectrum. The data values for the illuminant (light source), and the reflectance of the object is processed into a set of 3 values that represent the color. The accuracy of such measurements is affected by the amount of reflected light captured by the aperture of the device's lens. Thus, the surface area of the sample plays an important factor in obtaining an accurate color reading.

However, the cable industry has traditionally relied on the subjective analysis (the human eye) of fiber operators to discern fiber colors. In cables with large number of fibers with distinct colors, it becomes increasingly challenging to distinguish more than 12 colors using the present techniques.

Fiber-counts in undersea cables have traditionally been low (12 or less). Training a cable operator to visually identify 12 unique colors is a relatively straightforward task. If necessary, a color board is used as a reference to minimize errors at splicing or repair stations. When larger fiber counts are used, typically in the shorter branch segments, some fibers are ring-marked. Thus, the need to identify individual fiber colors was largely met without having to come up with a mechanism to measure color on a single strand of fiber.

A common technique used to measure colors on fibers is to stack them against each other to form an array that has a surface area big enough to cover an aperture of a color spectrophotometer. (The smallest aperture size seen in some special applications is about 8 mm in diameter.) This method is sometimes used by optical fiber suppliers but is not a practical solution for most field operations, such as cable laying and undersea deployment. Stacking multiple fibers into an array typically requires a minimum 1 meter of excess fiber that is cut into smaller lengths to build the fiber array which is then measured using a color spectrophotometer. Cable operators often don't have this length of excess fiber to spare. Also, building the fiber array would add a significant amount of time for each measurement which is not practical for time-sensitive field or factory operations.

A quantifiable method of identifying fiber colors has hitherto not been undertaken due to a combination of a lack of critical need in lower fiber count cables where the naked eye was often sufficient to distinguish a small number of colors and due to the limitation in the spectrophotometers in general of being unable to measure the color on surfaces as small as 2 mm.

Previous fiber color measurement techniques were more suited for laboratory settings. In such conditions, ample fiber length could be used to create a fiber array with a surface area large enough to be measured by spectrophotometers using conventional techniques. In addition, with a typical colored optical fiber having an outer diameter of 250 um, a single strand of optical fiber offers a very small surface. Thus, standard measurement techniques using a color spectrophotometer are insufficient to provide a practical method of optical fiber identification via color matching.

It would be beneficial to have an automated technique for accurately identifying individual fibers in a high fiber count cable. The following description provides examples of systems, devices and processes usable to make the accurate identification of the individual fibers.

BRIEF SUMMARY

In one aspect, a method for determining a color of an optical fiber is disclosed. The method may include obtaining, by a processor, a color value of an optical fiber in a fiber optic cable from a spectrophotometer camera. The processor may compare the color value of the optical fiber to a color value of each reference color from a plurality of reference colors, where each reference color has a unique color value. A color match score may be generated for the color value of the optical fiber with respect to the color value of each reference color based on a result of the comparing. The color value of each reference color is different for each reference color and the color match score has a score value. The processor may obtain a confidence value for a pair of color match scores that are closest in score value. Based on the confidence value, one of the reference colors from the plurality of reference colors may be identified as a color of the optical fiber.

In another aspect, a system is disclosed that includes a spectrophotometer camera, a fiber adaptor, a processor and a memory. The system also includes a fiber adaptor operable to hold a single optical fiber of a fiber optic cable in a field of view of the spectrophotometer camera. The memory stores instructions that, when executed by the processor, configure the system to obtain, by a processor, a color value of an optical fiber in a fiber optic cable from a spectrophotometer camera. The processor compares the color value of the optical fiber to a color value of each reference color of a plurality of reference colors, where each reference color has a unique color value. A color match score may be generated for the color value of the optical fiber with respect to the color value of each reference color of the plurality of reference colors based on a result of the comparing, where the color value of each reference color is different for each reference color and the color match score has a score value. A confidence value may be obtained for a pair of color match scores that are closest in score value. The processor may identify, based on the confidence value, one of the reference colors from the plurality of reference colors as a color of the optical fiber of the fiber optic cable.

In a further aspect, a non-transitory computer-readable storage medium is provided. The computer-readable storage medium includes instructions that when executed by a processor, cause the processor to read a sample color from an optical fiber in a fiber optic cable. The sample color has a color value. The processor may select a color match algorithm from a plurality of color matching algorithms and input the color value of the color sample into the selected color match algorithm. The selected color matching algorithm processes the inputted color value with respect to a plurality of reference colors. The processor may generate for each reference color of the plurality of reference colors a color match score. A confidence value may be generated based on a ratio of scores of two closest matched colors. If another color match algorithm from the plurality of color matching algorithms is available for selection, the performing, selecting, inputting, generating of another color match score, and generating another confidence value is repeated for that match algorithm. When no other color match algorithm is available, the processor may determine a largest confidence value from the generated confidence value, select a color corresponding to the determined largest confidence value as the color of the optical fiber in the fiber optic cable, and generate an output indicating the selected color.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The disclosed system, devices and processes demonstrate novel techniques to apply an existing colorimetry technology to identify color on a very small surface of an optical fiber. The solution is optimized for field applications: cost-effective, does not require an elaborate setup, provides instant results, reliable, non-destructive and needing less than approximately 2" of fiber length.

A quantitative approach as presented herein eliminates the over-reliance on a human operator to discern fiber colors, which can significantly reduce errors. This would provide considerable time and cost-savings by minimizing cross-splices and improves overall production quality.

The described examples have the advantage of requiring almost no sample preparation of the fiber unlike the traditional array-based fiber color measurements which requires at least ~1 meter of sacrificial fiber lead as well as substantial operator time to create the fiber array.

The techniques outlined herein describe how a color spectrophotometer can be used to uniquely identify the color on a single fiber.

Figure 1A:
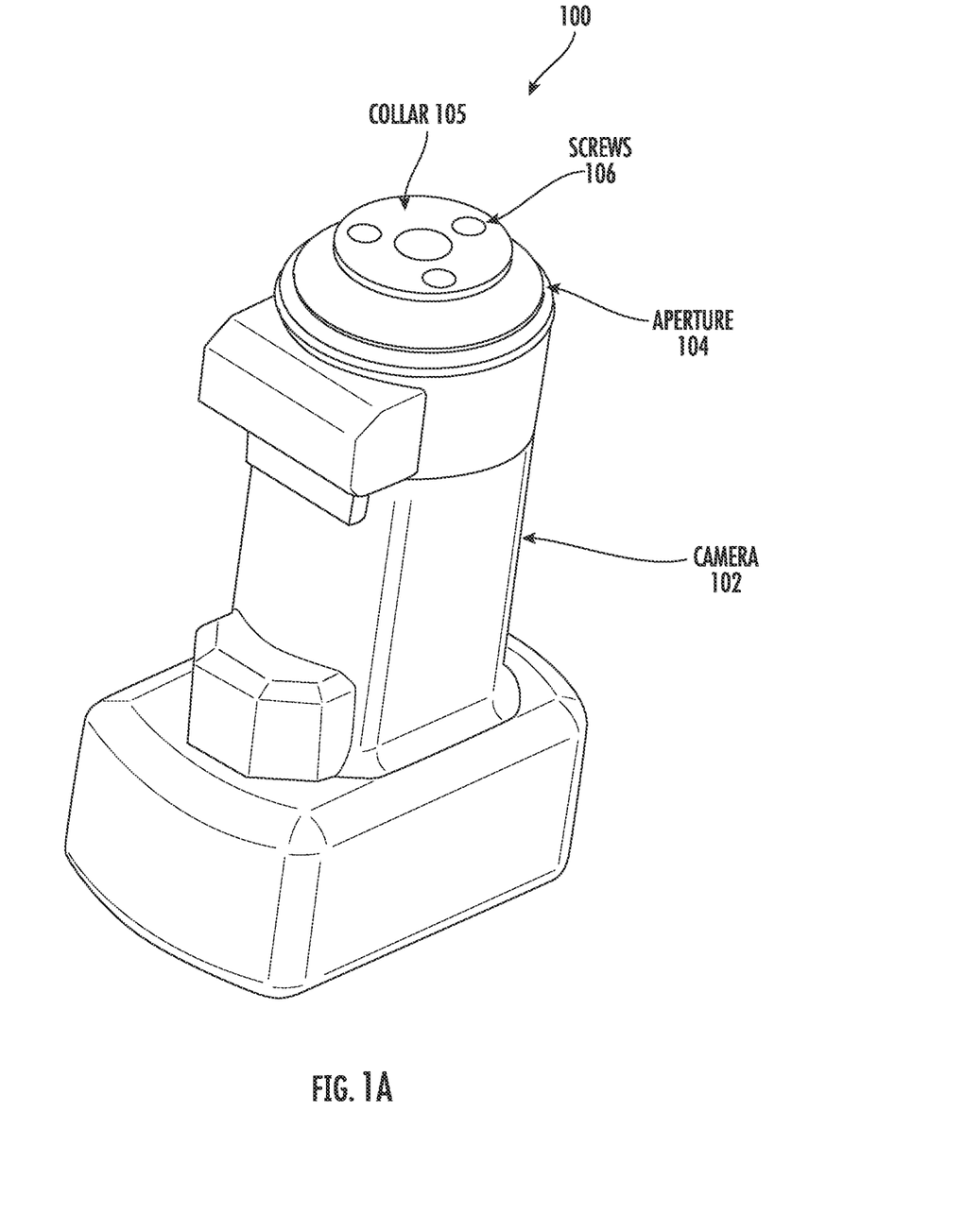
FIG. 1A shows an example of a camera system for single-fiber color identification.

The described solution is a mechanism to accurately identify color of a single strand of optical fiber in a way that is suitable (quick, portable, and easy to use) for use in a factory or cable ship environment. FIG. 1A shows an example of a camera system for single-fiber color identification. The measurement mechanism involves a combination of a fiber holding device built for a color spectrophotometer camera, such as a modified CM-700d by Konica Minolta Sensing camera 100, and a color-matching algorithm that identifies the fiber color by matching the measurement to a database of pre-determined values for each color. The camera system 100 may include a camera 102, an aperture 104, and screws 106. The aperture 104 is a customized aperture configured to restrict the field of view of the camera to a dimension suitable for sampling an optical fiber of a fiber optic cable. The screws 106 attach a collar 105 around the aperture 104 to the camera 102. The collar 105 may be a circular concentric disk or the like.

An example spectrophotometer, such as camera 102, quantifies the color by representing it in terms of three values: L* (lightness), a* (red-green), and b* (blue-yellow) in the 3-dimensional CIE rectangular color space. Of course, other color spaces may be used, such as RGB, HSV, HSL, YPbPr or the like. Additionally, the spectrophotometer camera 102 also records the spectrophotometric curve, which is the amount of reflected light at each wavelength between 400 nm and 700 nm (range of visible light) for each sample measurement. Both the L*, a*, b* values and the values of the spectrophotometric curve data for a given fiber sample measurement may be used to determine the optical fiber color by matching the obtained color value data to a look-up table with pre-determined reference values for each optical fiber color used when building a fiber optic cable. Examples of the colors of the optical fibers used in fiber optic cables may include red, blue, yellow, brown, green, orange, violet, black, rose, aqua, olive, white, lime, tan, magenta, grey, natural, dark green, lavender, purple, sky, pink, peach and saffron.

Figure 1B:
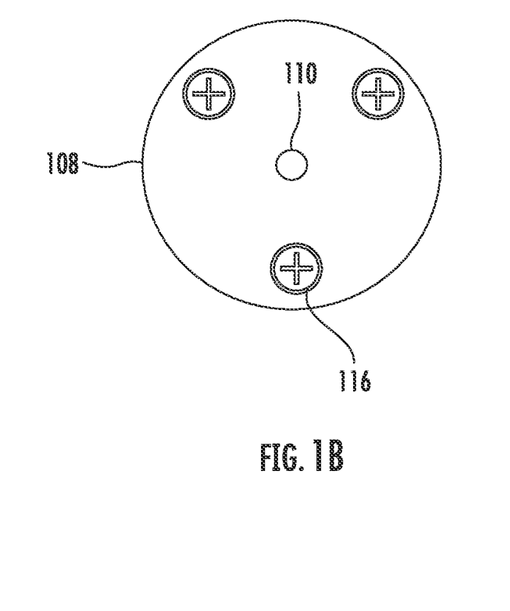
FIG. 1B illustrates an example of an aperture of the camera of FIG. 1A in accordance with an embodiment.

FIG. 1B illustrates an example of a collar over a cover with an aperture for use with the spectrophotometer camera of FIG. 1A. The cover 108 with the aperture is screwed tight over the color spectrophotometer camera light source such as a modified CM-700d by Konica Minolta Sensing camera 100 of FIG. 1A. The collar may be operable to be affixed to the cover 108, via holding elements, which in this example are the screws 116. The aperture 110 may have a diameter of approximately 2 millimeters (mm). The 2 mm diameter of the aperture 110 may be selected to limit a field of view of the camera 110 for sampling a single optical fiber.

Figure 1C:
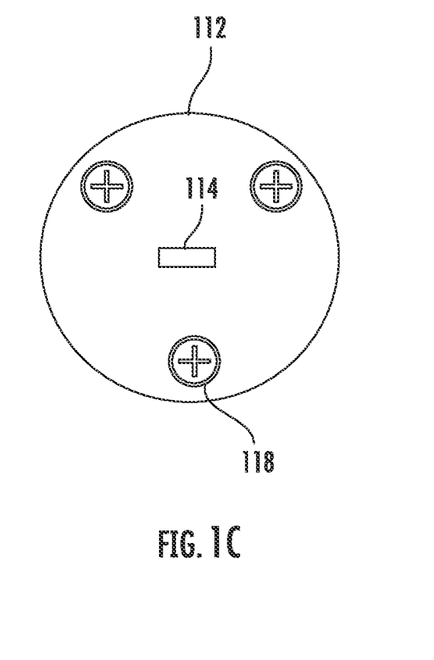
FIG. 1C illustrates another example of an aperture of the camera of FIG. 1A in accordance with another embodiment.

FIG. 1C illustrates another example of an aperture for use with the spectrophotometer camera of FIG. 1A. Similar to cover 108, the cover 112 may be screwed tight over the light source of a color spectrophotometer such as a modified CM-700d by Konica Minolta Sensing camera 100 of FIG. 1A. The collar may be operable to be affixed to the cover 108, via holding elements, which in this example are screws 118. The aperture 112 may have dimensions of approximately 1 mm by approximately 3 mm. The dimensions of the aperture 112 may be selected to limit the field of view of the camera 110 for sampling a single optical fiber.

Figure 2A:
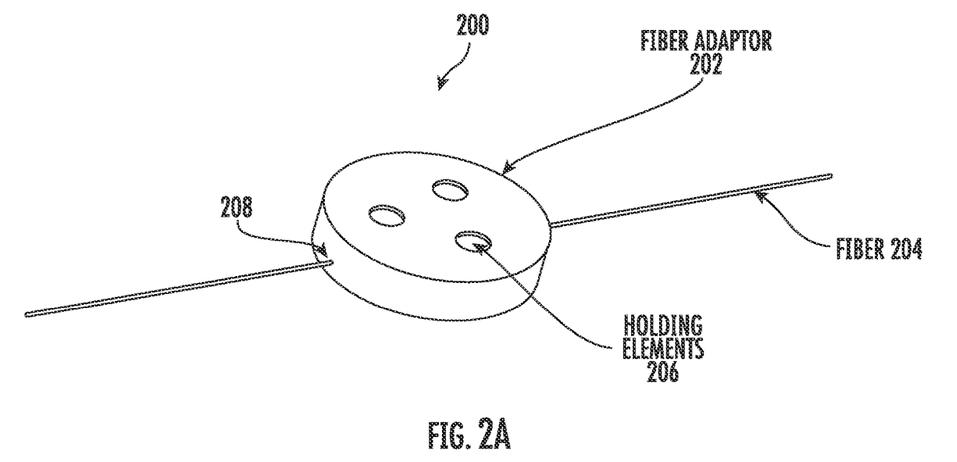
FIG. 2A shows a top view of an example of a fiber adaptor usable with the camera system of FIG. 1 for single-fiber color identification.

FIG. 2A shows a top view of an example of a fiber adaptor usable with the camera system of FIG. 1 for single-fiber color identification. The adaptor system 200 includes the fiber adaptor 202 and holding elements 206. The fiber 204 is placed through an opening 208 in each side of the fiber adaptor 202. In some examples, there may be several holding elements 206. In the illustrated example, there may be three holding elements 206, which may be magnets, dimples, low-adherence adhesive dots, or the like in or on the fiber adapter 202. The holding elements 206 may be operable to maintain a constant pressure over the aperture, such as aperture 104 of FIG. 1A.

The fiber adaptor 202 is shown as circular and the aperture 104 of FIG. 1A is also circular, but is a custom aperture configured to limit the field of view of the camera 102 to sampling the diameter of the fiber 204.

Figure 2B:
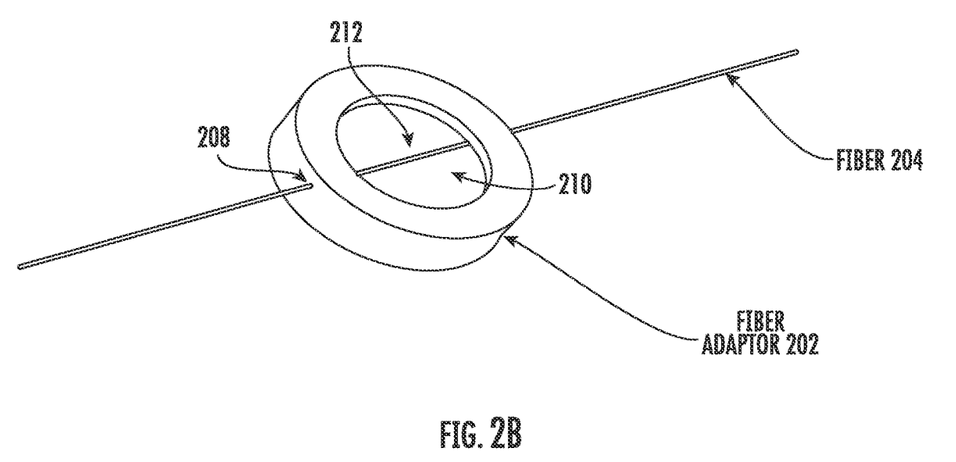
FIG. 2B shows a bottom view of the example of the fiber adaptor in the example of FIG. 2A.

FIG. 2B shows a bottom view of the example of the fiber adaptor in the example of FIG. 2A. The fiber adapter 202 has a cove 210 that enables the fiber adaptor 202 to fit over the aperture 104 and be held in place by the holding elements 206 and a fiber groove 212. The fiber groove 212 is shown with the fiber 204 within the fiber groove 212.

In an operational example, the fiber-under-test (204) is threaded through the openings 208 in the fiber adapter (202). The fiber groove 212 in the adapter is directly above the circular aperture (4). This ensures repeatable placement of the fiber sample (1) over the circular aperture (4). The opaque inner surface of cove 210 of the fiber adaptor 202 is operable to ensure that the region outside the fiber surface is effectively blocked from affecting the sampling of the fiber 204. The fiber adaptor 202 is placed onto the spectrophotometer 2 mm aperture, such as 302 shown in FIG. 3.

Figure 2C:
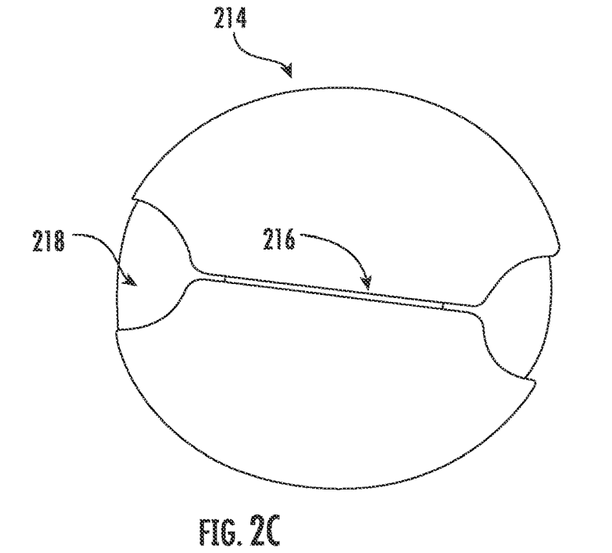
FIG. 2C shows a top view of another example of a fiber adaptor usable with the camera system of FIG. 1 for single-fiber color identification.

FIG. 2C shows a top view of another example of a fiber adaptor usable with the camera system of FIG. 1A for single-fiber color identification.

The fiber adaptor 214 includes an optical fiber trough 216 and guide 218. The guide 218 enables an operator to insert a single optical fiber (not shown in this example) into the optical fiber trough 216. The fiber adaptor 214 with the single optical fiber in the optical fiber trough 216 may be affixed to a spectrophotometer camera, such as that shown in the disclosed examples. The fiber adaptor 214 is operable to hold the single optical fiber in the field of view of the spectrophotometer camera with a modified aperture as shown in other examples.

Figure 2D:
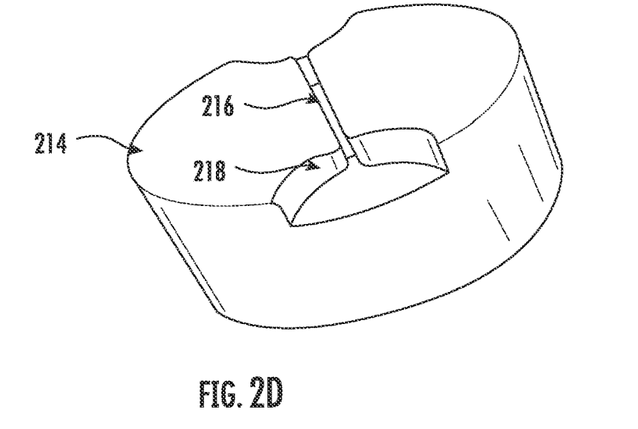
FIG. 2D shows a plan view of the other example of the fiber adaptor of FIG. 2C usable with the camera system of FIG. 1 for single-fiber color identification.

FIG. 2D shows a plan view of the other example of the fiber adaptor of FIG. 2C usable with the camera system of FIG. 1A for single-fiber color identification. The fiber adaptor 214 is shown with the optical fiber trough 216 in view with the guide 218 shown as a depression in a side of the fiber adaptor 214. The guide 218 enables the optical fiber to be positioned and held within the optical fiber trough 216

Figure 2E:
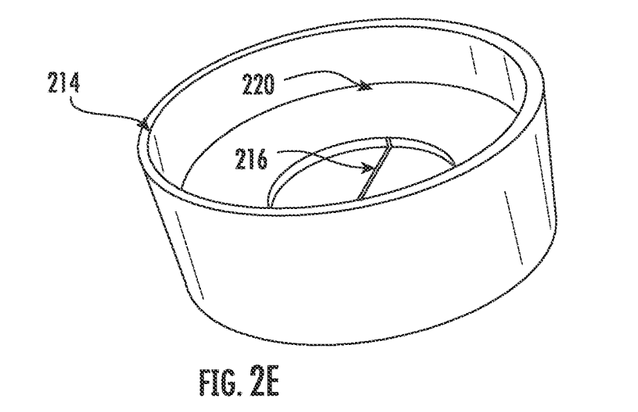
FIG. 2E shows a bottom view of the other example of the fiber adaptor of FIG. 2C usable with the camera system of FIG. 1 for single-fiber color identification.

FIG. 2E shows a bottom view of the other example of the fiber adaptor of FIG. 2C usable with the camera system of FIG. 1A for single-fiber color identification. The bottom view of the fiber adaptor 214 shows the optical fiber trough 216 in the top side of the fiber adaptor 214 with a fitment ridge 220 partially down the side of the fiber adaptor 214. The fitment ridge 220 enables the fiber adaptor 214 to be securely positioned on the spectrophotometer camera shown in the earlier examples.

Of course, other configurations of a fiber adaptor 214 may be utilized with an intended purpose being to maintain the optical fiber in a position that enables sufficient sampling to enable consistent and accurate identification of the single optical fiber being sampled.

Figure 3:
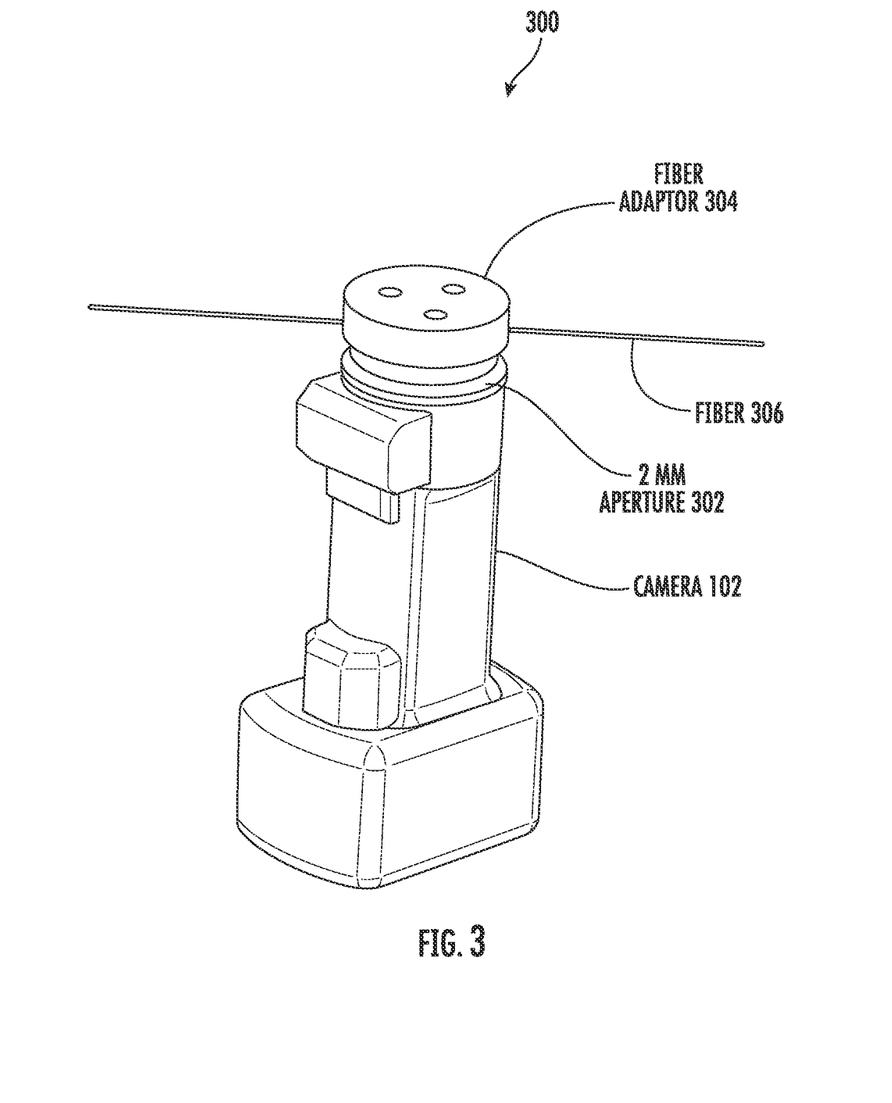
FIG. 3 shows an example of a camera system with a fiber adaptor set up for single-fiber color identification.

FIG. 3 shows an example of a camera system with fiber adaptor set up for single-fiber color identification. the fiber adaptor 304, which is a homogenously colored enclosure, holds the fiber 306 in place and positions the fiber 306 consistently over the 2 mm aperture 302 of the color spectrophotometer camera 102 (e.g., a Konica CM-700d). The holding elements, such as 206, serve to align the fiber adaptor 304 to the screws (shown in an earlier example). A single optical fiber measurement may be made against the black background of the fiber adaptor. In an example, the measured values are then matched against a look-up table of populated, reference color measurement data using a matching algorithm. Both the measurement technique and matching algorithm are explained below with reference to other figures.

Figure 4:
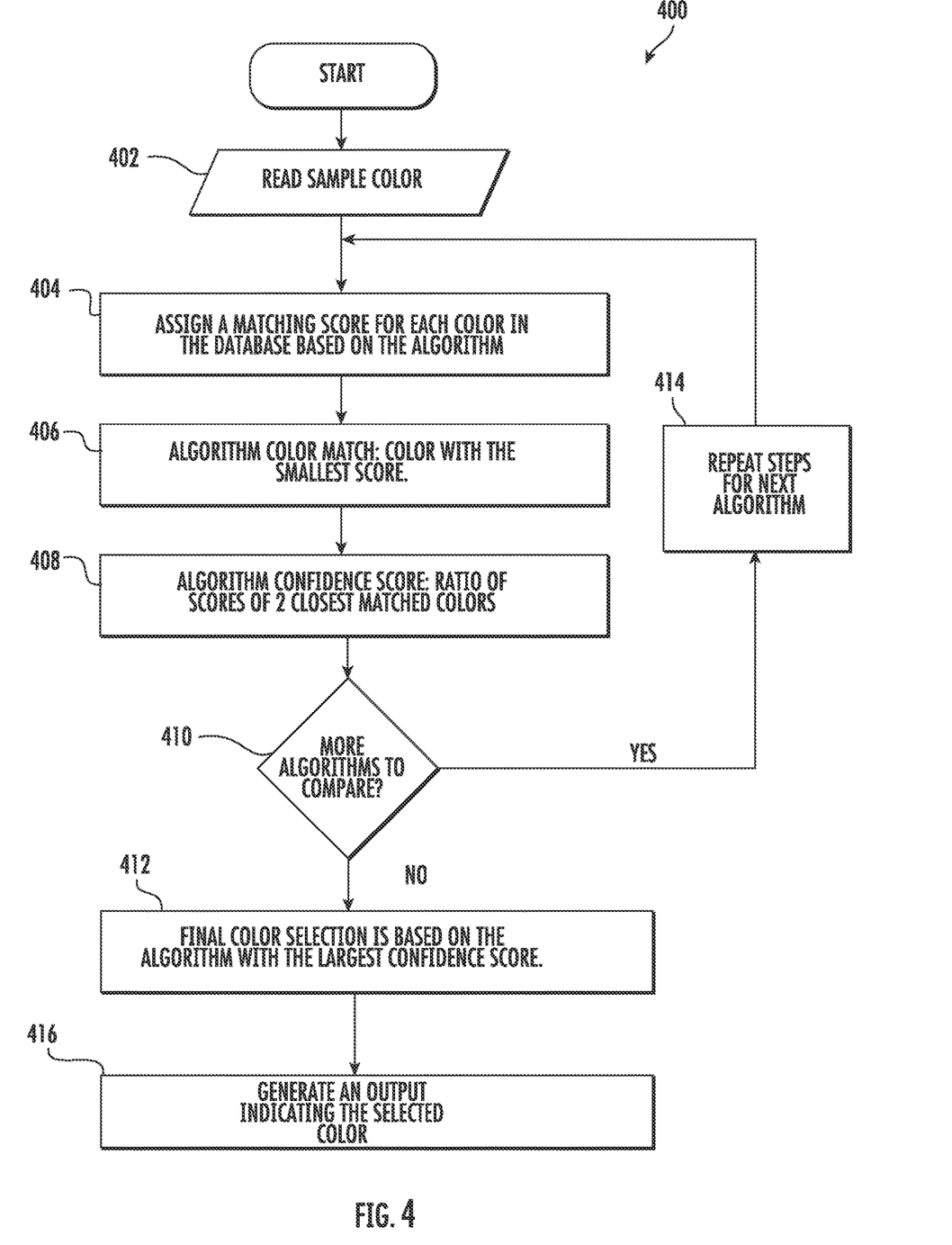
FIG. 4 illustrates in a flowchart an example of process of the disclosed subject matter in accordance with an embodiment.

FIG. 4 illustrates a process flow chart of the disclosed subject matter in accordance with an embodiment. The steps of process 400 may be performed by a processor that may be operable to determine a color of an optical fiber specimen by finding the closest match in a database of reference colors using one or more algorithms. Examples of two algorithms usable in the process 400 are shown in and described with respect to FIG. 5 and FIG. 6. For example, a processor may have access to programming code that when executed by the processor causes the processor to implement the process 400. The programming code may be stored in a memory (all of which are shown and described with respect to a later example).

In step 402, a processor may read a sample color from an optical fiber in a fiber optic cable, where the sample color has a color value. The color value may be an L*a*b* color value, such as 24.722, 11.480 and 3.862 for red or the like for other colors.

In step 404, the processor may select a color matching algorithm from a plurality of color matching algorithms for use in determining the color match for the single optical fiber.

In step 406, after selection of the color matching algorithm, the processor may input the color value into a selected color matching algorithm. The selected color matching algorithm processes the inputted color value with respect to a plurality of reference colors and generates a color match score for each reference color of the plurality of reference colors.

In step 408, the processor may generate a confidence value based on a ratio of color match scores of two closest matched colors. For example, the processor may utilize two of the closest match scores in a ratio to determine the confidence value. The confidence value is an example of how the color distinction may be measured. The generation of the confidence value is described in more detail below.

The processor, at step 410, may determine if another color matching algorithm from the plurality of color matching algorithms is available for selection, selecting the other color matching algorithm. If the response to the determination at step 410 is YES, the process 400 may proceed to step 414.

At step 414, the processor may input a color value into the other selected color matching algorithm to generate another color match score using the other selected color matching algorithm. The processor may use the other color match score output from the other selected color matching algorithm to generate another confidence value. When no further color matching algorithms are available, each confidence value generated based on a respective color match score from each color matching process may be evaluated.

When the response to the determination at step 410 is No, another color matching algorithm is not available, the process may proceed to step 412. At step 412, the processor may select a color corresponding to the determined highest confidence value as the color of the optical fiber in the fiber optic cable. The processor may generate an output indicating the selected color.

Alternatively, instead of determining a confidence value, the color matching scores may be normalized between the different color matching algorithms. An alternative color matching algorithm may include the steps of creating or obtaining by a processor a color reference database, such as Color[ ], by measuring samples of fiber colors. Once a color reference database is available for use by the processor. The processor may be operable, in response to a user input or automatically, when an optical fiber is detected as being in place, the processor may be operable to take a color measurement of the fiber sample under test. The processor may use a first color matching algorithm (discussed with reference to another figure) to determine the closest matched color, X, and corresponding Matching Score_X. The processor may return the color name X and a value for the Matching Score_X (e.g., Violet and 85). The processor in the alternative example, may use a second color matching algorithm to determine the closest matched color. In the second color matching algorithm, the processor may determine the closest matched color name, Y, and corresponding Matching Score_Y (e.g., Lavender and 83). To determine the color, the processor may evaluate or compare the Matching Score_X to the Matching Score_Y. Based on the result of the evaluation or comparison, the processor may select a color as the color of the optical fiber and generate an output indicating the selected color. For example, if (Matching Score_X>Matching Score_Y), the selected color=X; Else, the selected color=Y. Using this logic and the results above, Matching Score of Violet=85, while the Matching Score of Lavender is 83. In this case, the selected color of the optical fiber would be Violet. In another operational example, Algorithm 1 may give the closest matching colors as: Peach (Score: 0.1) and Pink (Score 2). Confidence score=2/0.1=20 for the color Algorithm 1. If for the same fiber, Algorithm 2 gives the closest matching colors as: Pink (Score: 0.5) and Magenta (Score: 1). Confidence score=1/0.5=2. So, the processor may determine the matching color is peach based on the highest confidence score from Algorithm 1.

Other color matching algorithms may also be used, and another example is described with reference to FIG. 5.

Figure 5:
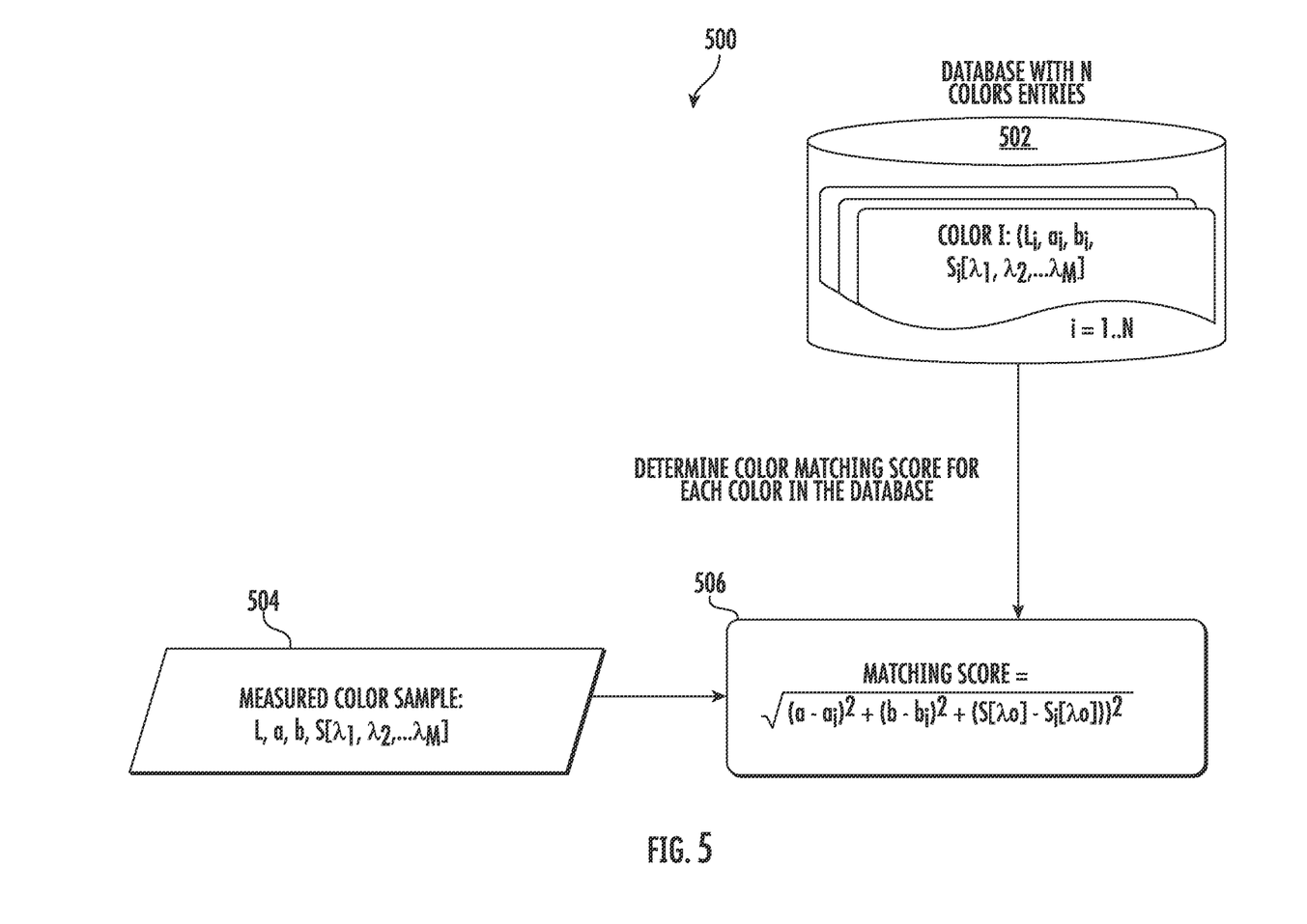
FIG. 5 illustrates an example of a color matching algorithm in accordance with an embodiment.

FIG. 5 illustrates another example of a color matching algorithm in accordance with an embodiment. The process 500 is an example of color matching algorithm usable as a first or second color matching algorithm. A processor may have access to programming code that when executed by the processor causes the processor to implement the process 500. The programming code may be stored in a memory (all of which are shown and described with respect to a later example). The process 500 when executed by a processor enabling the processor to determine the closest color match by measuring the Euclidean distance between three coordinates comprised of the L*, a*, b* values as well as a reflectance spectrum space value, $S[\lambda_O]$, where $S[\lambda_O]$ is the reflectance value at a wavelength $\lambda_O$ which returns the largest spectral response. Of course, other color spaces, such as those described above, may be used.

A database of N color entries 502 may store color coordinate values (e.g., L*a*b*) and reflectance spectrum space values $S[\lambda_1-\lambda_N]$. At step 504, the processor may receive a measured color sample with values for $L_i^*$, $a_i^*$, $b_i^*$ and $S[\lambda_i]$. The processor at 506 may calculate a color match score for each color 1-N in the database, where 'i' is the respective color match score for each respective color [1 to N] in the database.

The processor may calculate the color match score as follows: Color Match Score, $=\mathrm{sqrt}((a^*-a_i^*)^2+(b^*-b_i^*)^2+(S[\lambda_O]-S_i[\lambda_O])^2)$, where subscript 'i'=1 to N, where N is the total number of entries in the color reference database, and the reflectance spectrum space value $S[\lambda_O]$ is the reflectance value at a given wavelength for the color sample under test and $S_i[\lambda_O]$ is the reflectance spectrum value of the reference color from the color entry database.

In the example, the processor may sort the colors from the color entry database as color[1-N] from closest matched to least matched based on the calculated color match score$_i$, where the smallest color match score corresponds to the closest match of the measured color sample to the reference color in the color entry database of N color entries 502. Continuing with this example, the matching color may be color X, e.g., Matching Color, X=Color [1]. The Color [1] may have a matching color score of 9, for example. The processor may determine another color having a next smallest matching color score (i.e., a color match score of 11). The processor may then determine a color matching score, which is a final score used by the algorithm, using the smallest matching color score and the next smallest matching color score. For example, the processor may determine the matching color score by taking the ratio of the matching color scores of the 2 closest matched colors for color X or color [1] in the color entry database of N color entries 502: Matching Color Score_X=Score$_i$[2]/Score$_i$[1].

The algorithm performs the same operation for each color 1-N in the database of N color entries 502. The output of process 500 being the ratio of matching color scores that produces the lowest value, may be provided for use in process 400. For example, the result of the algorithm may be output for further processing by the processor such as step 412 in process 400.

Figure 6:
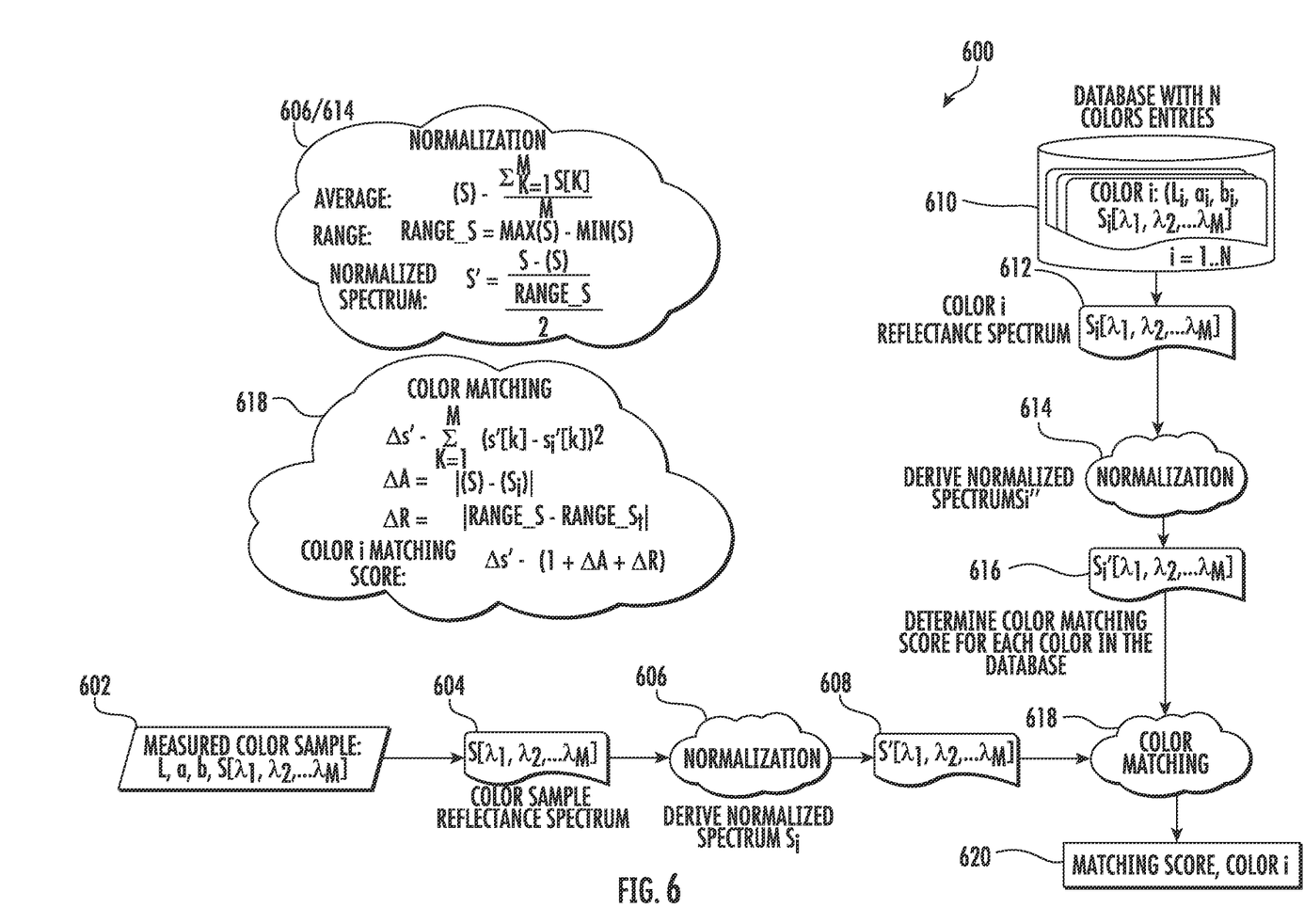
FIG. 6 illustrates another example of a color matching algorithm in accordance with an embodiment.

FIG. 6 illustrates another example of a color matching algorithm in accordance with an embodiment. The color matching algorithm implemented according to process 600 is operable to enable a processor to match two colors using their reflectance spectra. A processor may have access to programming code that when executed by the processor causes the processor to implement the process 600. The programming code may be stored in a memory (all of which are shown and described with respect to a later example).

To account for amplitude variations, for example, based on the fiber adaptor, the spectra being compared are first normalized. The color comparison is then done using 3 parameters: the Euclidean distance between the two normalized spectra, average value of the reflectance spectra and the magnitude of the range (max−min) of reflectance spectra. Details of the normalization and the subsequent color matching is shown in FIG. 6.

In the example, $S[\lambda]$ represents an array of reflectance values at different wavelengths. $\max(S[\lambda])$ is the largest reflectance value and $\min(S[\lambda])$ is the smallest. The two values are at different wavelengths (unless the spectrum is a flat line, which is not normally the case). At measure color sample step 602, the processor may receive a measure color sample of an optical fiber sample under test. The measured color sample may include color space $L^*$, $a^*$, $b^*$ values as well as a reflectance spectrum space value, $S[\lambda_0]$, where $S[\lambda_0]$ is the reflectance value at a wavelength $\lambda_0$ which returns the largest spectral response. Of course, other color spaces, such as those described above, may be used. The reflectance spectrum 604 may be obtained from the measured color sample from step 602. At normalization step 606, the processor may determine a normalized reflectance, $S'[\lambda]$ of the optical fiber sample under test (as shown in cloud 606/614), using the following: $S'[\lambda]=(S[\lambda]-\text{Avg}\_S)/(\text{Range}\_S/2)$, here $\text{Avg}\_S=\text{average}(S[\lambda])$ AND Range_S is the difference between a maximum reflectance value and a minimum reflectance value (e.g., $\text{Range}\_S=\max(S[\lambda])-\min(S[\lambda])$).

The processor at normalization of reference color spectrum 614 also determines a normalized reflectance value for the color entries in the database with color entries 610. The database with color entries 610 may include reference colors to which the measures color samples are matched. For example, for each color, T in the database with color entries 610, the processor by executing code for implementing the color matching algorithm, may calculate: a normalized reflectance, $S'_j[\lambda]$, an average reflectance ($\text{Avg}\_S_j$), and a range of reflectance ($\text{Range}\_S_j$). The determinations are similar to the reflectance spectrum normalization step 606 determinations.

The results of the normalization step 606 for the measured color sample and the normalization of reference color spectrum 614, the processor may calculate a color match score for each color, T in the database, as follows: $\text{Score}_j=\Delta S_j*(1+\Delta\text{Avg}+\Delta\text{Range})$, where $\Delta S_j=\Sigma(S'[\lambda]-S'_j[\lambda])^2$, $\Delta\text{Avg}=\text{abs}(\text{Avg}\_S-\text{Avg}\_S_j)$ and $\Delta\text{Range}=\text{abs}(\text{Range}\_S-\text{Range}\_S_3)$.

In response to obtaining a color match processor may sort the colors, for example, Color [j] from closest matched to least matched based on the calculated $\text{Score}_3$. The smallest Score corresponds to the closest match. For example, the smallest score may be for color Y, e.g., Matching Color, Y=Color [3]. In the example, the Color [3] may have a matching color score of 8, for example. The processor may determine another color having a next smallest matching color score (i.e., a color match score of 10). The processor may then determine a color matching score, which is a final score used by the algorithm, using the smallest matching color score and the next smallest matching color score. For example, the processor may determine the matching color score by taking the ratio of the matching color scores of the 2 closest matched colors for color Y or color [3] in the database of N color entries 502: Matching Score_Y=$\text{Score}_j[\lambda_0]/\text{Score}_j[3]$.

The algorithm performs the same operation for each color 1-N in the database of N color entries 610. The output of process 600 being the ratio of matching color scores that produces the lowest value, may be provided for use in process 400. For example, the result of the algorithm may be output for further processing by the processor such as step 412 in process 400.

Figure 7:
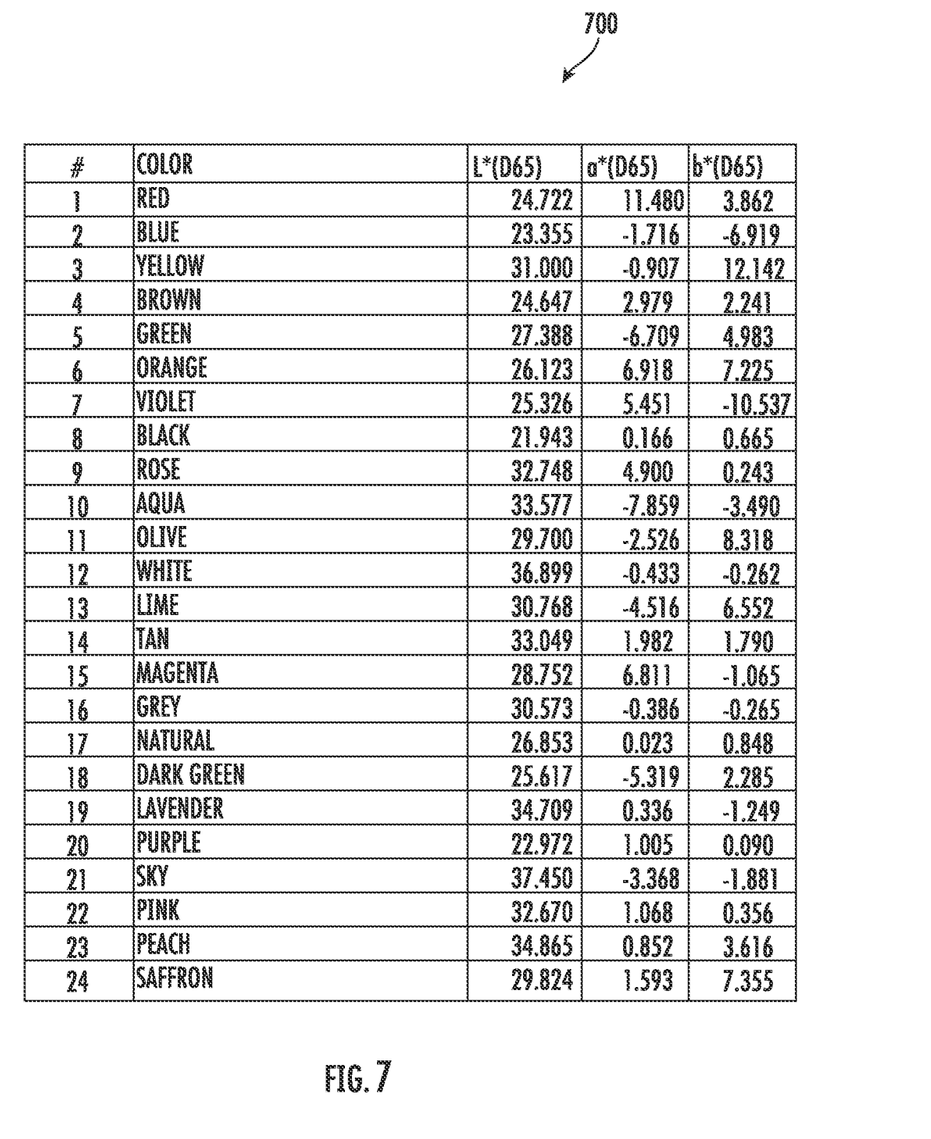
FIG. 7 illustrates an example of a reference color entry database (L*a*b*).

FIG. 7 illustrates an example of a reference color entry database ($L^*a^*b^*$). The sample database of reference fiber colors may have a list of colors of optical fibers that may be used in a fiber optic cable. Optical fibers of all or just some of the colors may be present in a fiber optic cable. For example, some fiber optic cables may have 6 optical fibers, while others may have 12 or 24 optical fibers. Examples of the colors of the optical fibers used in fiber optic cables may include red, blue, yellow, brown, green, orange, violet, black, rose, aqua, olive, white, lime, tan, magenta, grey, natural, dark green, lavender, purple, sky, pink, peach and saffron. The $L^*a^*b^*$ values in the columns adjacent to the color name are reference values against which the measured sample color values are compared for color matching and scoring.

Figure 8:
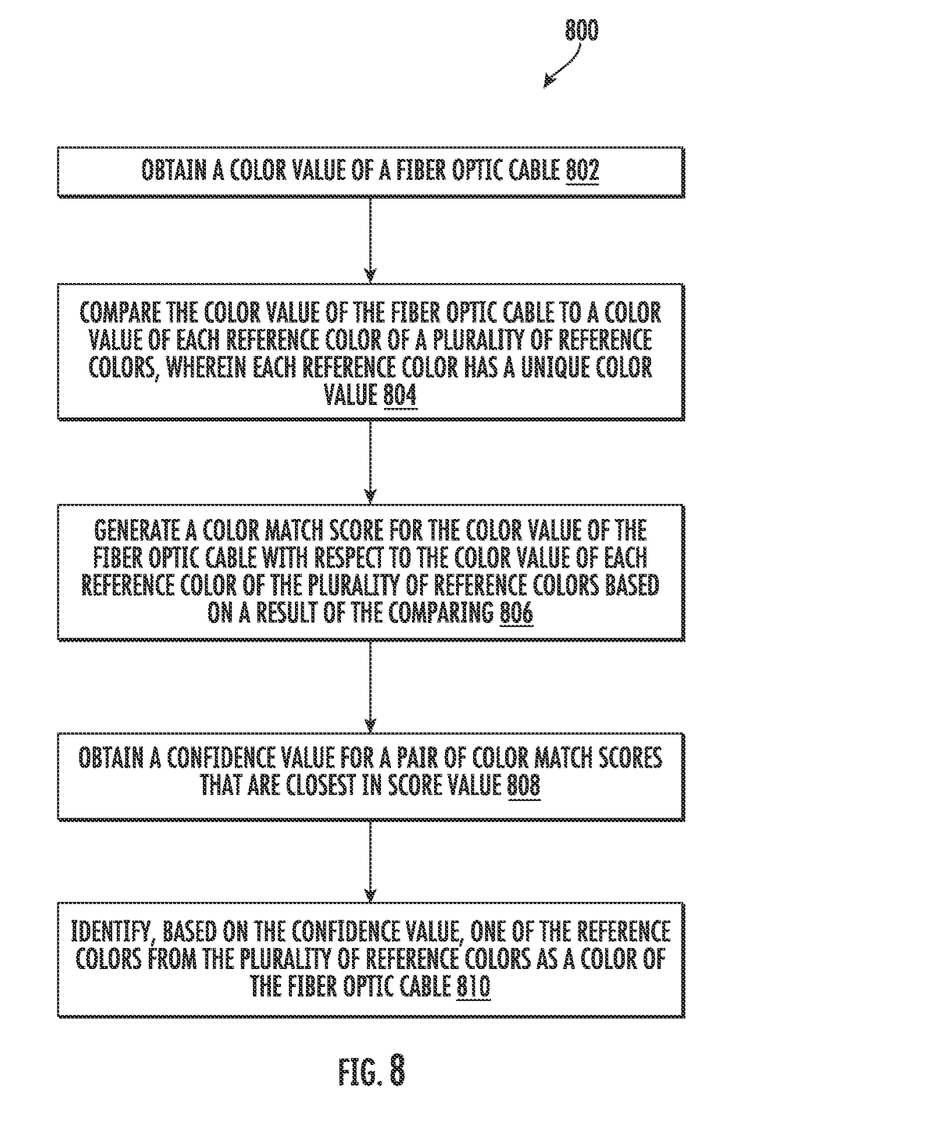
FIG. 8 illustrates in a flowchart an example of another process in accordance with an embodiment.

FIG. 8 illustrates in a flowchart an example of another process in accordance with an embodiment. In block 802, a processor executing process 800 obtains a color value of a fiber optic cable.

In block 804, the processor may be operable to compare the color value of the fiber optic cable to a color value of each reference color of a plurality of reference colors, wherein each reference color has a unique color value.

In block 806, the processor generates a color match score for the color value of the fiber optic cable with respect to the color value of each reference color of the plurality of reference colors based on a result of the comparing, wherein the color value of each reference color is different for each reference color and the color match score has a score value. For example, generating a color match score further includes utilizing a first algorithm to determine a first color match score, and utilizing s second algorithm to determine a second match score. In an example, when determining the first color match score, a process may include accessing a database having a plurality of color entries, wherein each color entry of the plurality of color entries has a color value. A first color match score for the obtained color value of the optical fiber may be determined with respect to each color entry of the plurality of color entries. In addition, determining the first color match score may include measuring a Euclidean distance between three coordinates in a color coordinate space for the obtained color value or obtaining a reflectance spectra value using the obtained color value.

In block 808, the processor obtains a confidence value for a pair of color match scores that are closest in score value. The process of block 808 may be similar to the processes for obtaining a confidence value as described with reference to the processes 400 and 500.

In block 810, the processor may identify, based on the confidence value, one of the reference colors from the plurality of reference colors as a color of the fiber optic cable. For example, identifying, based on the confidence value, one of the reference colors may further include determining which reference color has the largest confidence value, and indicating the reference color with the largest confidence value as the color of the fiber optic cable. In a further example, the identifying may include generating a ratio of two color match scores having scores that most closely match a reference color value and assigning the ratio as the confidence value. Other technical features may be readily apparent to one skilled in the art from the following figures, descriptions, and claims.

Figure 9:
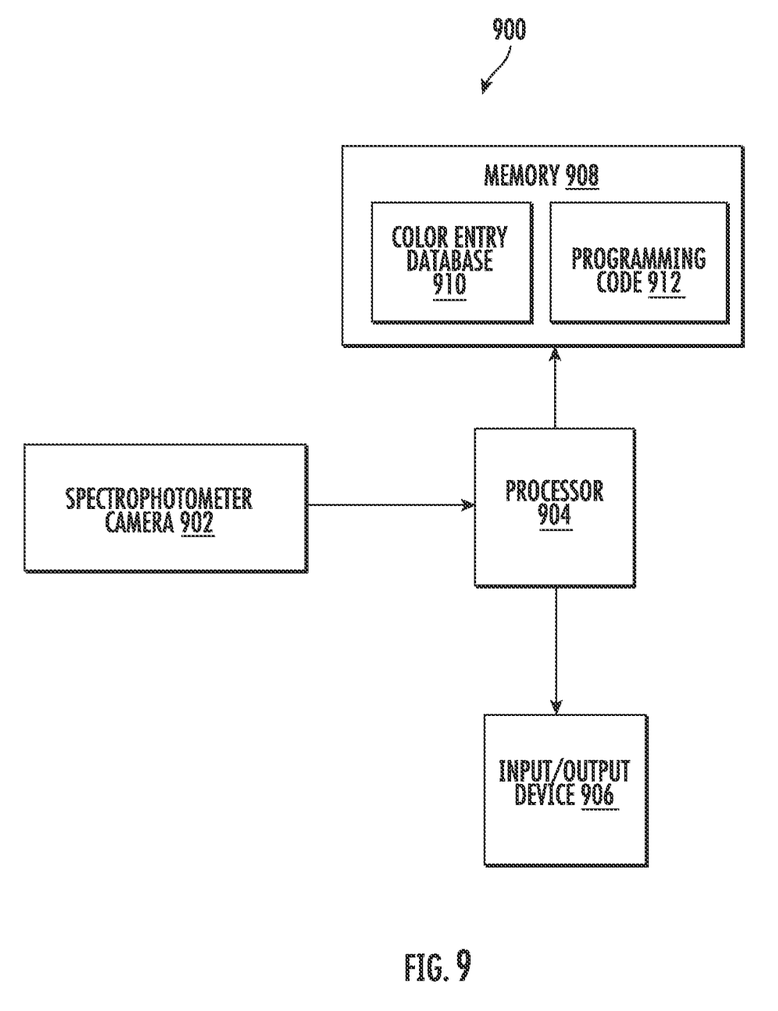
FIG. 9 illustrates a functional block diagram of a color matching system usable to implement the examples described with respect to FIGS. 1-8.

FIG. 9 illustrates a functional block diagram of a color matching system usable to implement the examples described with respect to FIGS. 1-8. The color matching system 900 includes a spectrophotometer camera 902, a processor 904, an input/output device 906, and a memory 908. The memory 908 includes at least a color entry database 910 and programming code 912.

The spectrophotometer camera 902 may be a camera system 100 operable to collect color data from an optical fiber of a fiber optic cable, such as the camera 102 of FIG. 1A and camera system with cap 300 of FIG. 3. As described in the earlier examples, the spectrophotometer camera 902 may include a fiber adaptor also described in earlier examples that is operable to enable the sampling of a single optical fiber.

In an example, the processor 904 is operable to execute programming code 912 to provide the optical fiber color identification processes described with reference to the examples of FIGS. 1A-8. For example, the memory 908 may store programming code 912 that when executed by the processor 904 implements the processes 400, 500, 600 and 800. In addition, the memory 908 may store a color entry database 910 that is a database of N color entries, such as the colors shown in the example of FIG. 7. Each color entry in the color entry database 910 may include a color space value, such as an L*a*b* color space value and a reflectance spectrum space value, for each color entry. In addition, each of the N color entries may correspond to a color of an optical fiber used in one or more configurations of a fiber optic cable. A fiber optic cable may have, for example, 6, 12, or 24 optical fibers. The programming code 912 may also include the number of color matching algorithms described with reference to the earlier examples, such as the examples of FIGS. 5 and 6.

The input/output device 906 may be a touchscreen display of a mobile device, a tablet computing device, a laptop, a dedicated computing device or the like. Alternatively, the input/output device 906 may be a display device coupled to a keyboard, touchpad, mouse or the like. The processor via the input/output device 906 may be operable to receive changes to settings and parameters in the color entry database 910 or the color matching algorithms.

The various elements of the devices, apparatuses or systems as previously described with reference to FIGS. 1-5 and 7A-C may include various hardware elements, software elements, or a combination of both. Examples of hardware elements may include structural members, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Herein, novel and unique techniques for an improved inspection of cables and cable joints are disclosed. The present disclosure is not to be limited in scope by the specific examples described herein. Indeed, other various examples of and modifications to the present disclosure, in addition to those described herein, will be apparent to those of ordinary skill in the art from the foregoing description and accompanying drawings.

Thus, such other examples and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method, comprising:
obtaining, by a processor, a color value of an optical fiber in a fiber optic cable from a spectrophotometer camera;
comparing the color value of the optical fiber to a color value of each reference color of a plurality of reference colors, wherein each reference color has a unique color value;
generating a color match score for the color value of the optical fiber with respect to the color value of each reference color of the plurality of reference colors based on a result of the comparing, wherein the color value of each reference color is different for each reference color and the color match score has a score value, and wherein generating the color match score further comprises determining the color match score by obtaining a reflectance spectra value using the obtained color value;
obtaining a confidence value for a pair of color match scores that are closest in score value; and
identifying, based on the confidence value, one of the reference colors from the plurality of reference colors as a color of the optical fiber.

2. The method of claim 1, wherein generating determining the color match score further comprises:
utilizing a first algorithm to determine a first color match score; and
utilizing a second algorithm to determine a second match score.

3. The method of claim 2, wherein determining the first color match score comprises:
accessing a database having a plurality of color entries, wherein each color entry of the plurality of color entries has a respective color value; and
determining a first color match score for the obtained color value of the optical fiber with each color entry of the plurality of color entries.

4. The method of claim 1, wherein identifying, based on the confidence value, the one reference color from the plurality of reference colors as the color of the optical fiber, further comprises:
determining which reference color has a largest confidence value; and
indicating the reference color with the largest confidence value as the color of the fiber optic cable.

5. The method of claim 4, further comprising:
generating a ratio of two color match scores having scores that most closely match a reference color value; and
assigning the ratio as the confidence value.

6. A system, comprising:
a spectrophotometer camera;
a fiber adaptor operable to hold a single optical fiber of a fiber optic cable in a field of view of the spectrophotometer camera;
a processor; and
a memory storing instructions that, when executed by the processor, configure the processor to:
   obtain a color value of the single optical fiber in the fiber optic cable from the spectrophotometer camera;
   compare the color value of the optical fiber to a color value of each reference color of a plurality of reference colors, wherein each reference color has a unique color value;
   generate a color match score for the obtained color value of the optical fiber with respect to the color value of each reference color of the plurality of reference colors based on a result of the comparing, wherein the color value of each reference color is different for each reference color and the color match score has a score value;
   obtain a confidence value for a pair of color match scores that are closest in score value; and
   identify, based on the confidence value, one of the reference colors from the plurality of reference colors as a color of the optical fiber;
   generate a ratio of two-color match scores having scores that most closely match a reference color value; and
   assign the ratio as the confidence value.

7. The system of claim 6, wherein generating the color match score further comprises:
utilize a first algorithm to determine a first color match score; and
utilize a second algorithm to determine a second match score.

8. The system of claim 7, wherein determining the first color match score comprises:
access a database having a plurality of color entries, wherein each color entry of the plurality of color entries has a respective color value; and
determine a first color match score for the obtained color value of the optical fiber with each color entry of the plurality of color entries.

9. The system of claim 7, wherein determining the first color match score comprises:
measure a Euclidean distance between three coordinates in a color coordinate space for the obtained color value.

10. The system of claim 7, wherein determine the second color match score comprises:
obtain a reflectance spectra value using the obtained color value.

11. The system of claim 6, wherein identifying, based on the confidence value, the one reference color further comprises:
determine which reference color has the largest confidence value; and
indicate the reference color with the largest confidence value as the color of the fiber optic cable.

12. A non-transitory computer-readable storage medium, the computer-readable storage medium including instructions that when executed by a processor, cause the processor to:
read a sample color from an optical fiber in a fiber optic cable, wherein the sample color has a color value;
select a color match algorithm from a plurality of color matching algorithms;
input the color value into a selected color match algorithm, wherein the selected color matching algorithm processes the inputted color value with respect to a plurality of reference colors;
   generate for each reference color of the plurality of reference colors a color match score using the selected color matching algorithm;
   generate a confidence value based on a ratio of scores of two closest matched colors;
   if another color match algorithm from the plurality of color matching algorithms is available for selection, performing the selecting, the inputting, the generating of another color match score, and the generating another confidence value;
   when no other color match algorithm is available,
   determine a largest confidence value from the generated confidence values;
   select a color corresponding to the determined largest confidence value as the color of the optical fiber in the fiber optic cable; and
   generate an output indicate the selected color.

13. The non-transitory computer-readable storage medium of claim 12, further causes the processor when generating a color match score to:
utilize a first algorithm to determine a first color match score; and
utilize a second algorithm to determine a second match score.

14. The non-transitory computer-readable storage medium of claim 13, further causes the processor when determining the first color match score to:
access a database having a plurality of color entries, wherein each color entry of the plurality of color entries has a color value; and
determine a first color match score for the obtained color value of the optical fiber with each color entry of the plurality of color entries.

15. The non-transitory computer-readable storage medium of claim 13, further causes the processor when determining the first color match score to:
measure a Euclidean distance between three coordinates in a color coordinate space for the obtained color value.

16. The non-transitory computer-readable storage medium of claim 13, further causes the processor when determining the second color match score to:
obtain a reflectance spectra value using the obtained color value.

17. The non-transitory computer-readable storage medium of claim 12, further causes the processor when identifying, based on the confidence value, the one reference color to:
determine which reference color has the largest confidence value; and
indicate the reference color with the largest confidence value as the color of the fiber optic cable.

* * * * *